US010243436B2

(12) United States Patent
Park et al.

(10) Patent No.: US 10,243,436 B2
(45) Date of Patent: Mar. 26, 2019

(54) WOUND ROTOR SYNCHRONOUS MOTOR FOR VEHICLE

(71) Applicant: Hyundai Motor Company, Seoul (KR)

(72) Inventors: Sangjin Park, Gyeonggi-do (KR); Hyoungjun Cho, Gyeonggi-do (KR); Jungwoo Lee, Gyeonggi-do (KR); Yeonho Kim, Gyeonggi-do (KR); SangHwa Do, Gyeonggi-do (KR); Ki Nam Kim, Gyeonggi-do (KR); Yongsung Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 371 days.

(21) Appl. No.: 15/333,278

(22) Filed: Oct. 25, 2016

(65) Prior Publication Data
US 2017/0353092 A1 Dec. 7, 2017

(30) Foreign Application Priority Data

Jun. 3, 2016 (KR) .................. 10-2016-0069582

(51) Int. Cl.
H02K 1/28 (2006.01)
H02K 19/02 (2006.01)
H02K 3/487 (2006.01)
H02K 1/24 (2006.01)
H02K 1/26 (2006.01)
H02K 3/18 (2006.01)
H02K 1/32 (2006.01)
H02K 3/24 (2006.01)
H02K 3/52 (2006.01)

(52) U.S. Cl.
CPC ............ *H02K 19/02* (2013.01); *H02K 1/24* (2013.01); *H02K 1/26* (2013.01); *H02K 1/325* (2013.01); *H02K 3/18* (2013.01); *H02K 3/24* (2013.01); *H02K 3/487* (2013.01); *H02K 3/527* (2013.01)

(58) Field of Classification Search
CPC .. H02K 1/26; H02K 1/28–1/325; H02K 3/24; H02K 3/487; H02K 3/527
See application file for complete search history.

(56) References Cited

FOREIGN PATENT DOCUMENTS

| JP | 6-66261 U | 9/1994 |
| JP | H11-89201 A | 3/1999 |
| JP | 2008-048491 A | 2/2008 |
| KR | 10-1364028 B1 | 2/2014 |
| KR | 10-2016-0029258 A | 3/2016 |

*Primary Examiner* — Ramon M Barrera
(74) *Attorney, Agent, or Firm* — Mintz Levin Cohn Ferris Glovsky and Popeo, P.C.; Peter F. Corless

(57) ABSTRACT

A Wound Rotor Synchronous Motor (WRSM) includes a rotor body that is rotatably installed at a predetermined gap within a stator and a rotor coil that is wound at a plurality of rotor teeth. The WRSM includes: bobbins that are each disposed at both sides of a shaft direction of the rotor body so as to support the rotor coil and that are fixed to the rotor body by the rotor coil; a wedge member that is inserted in a shaft direction between rotor teeth of the rotor body so as to protrude to the outside of both ends of the rotor body, the wedge member supporting the rotor coil; and end coil covers that enclose a protruded portion of the wedge member at both sides of the shaft direction of the rotor body and that are each mounted at the bobbins.

14 Claims, 5 Drawing Sheets

WOUND ROTOR SYNCHRONOUS MOTOR FOR VEHICLE

CROSS-REFERENCE TO RELATED APPLICATION

This application claims priority to and the benefit of Korean Patent Application No. 10-2016-0069582 filed in the Korean Intellectual Property Office on Jun. 3, 2016, the entire contents of which are incorporated herein by reference.

BACKGROUND

(a) Field of the Invention

The present invention relates to a Wound Rotor Synchronous Motor (WRSM), more particularly, to a non-molding type field winding rotor structure for a WRSM for a vehicle.

(b) Description of the Related Art

In general, a hybrid vehicle or an electric vehicle may be referred to as an environmentally-friendly vehicle, and typically generate a driving torque by an electric motor (hereinafter, referred to as a "drive motor") that utilizes electrical energy.

For example, a hybrid vehicle may be driven in an Electric Vehicle (EV) mode, which is a pure electric vehicle mode using only power of a drive motor, or may be driven in a Hybrid Electric Vehicle (HEV) mode using the entire torque of an engine and a drive motor as power. A general electric vehicle is driven using a torque of a drive motor as power.

A drive motor that is used as a power source of such an environmentally-friendly vehicle mostly uses a Permanent Magnet Synchronous Motor (PMSM). In order to exhibit a maximum performance in a limited layout condition, it is necessary that such a PMSM maximizes a performance of a permanent magnet.

In the permanent magnet, a neodymium (Nd) component enhances intensity of the permanent magnet, and a dysprosium (Dy) component enhances high temperature demagnetization tolerance. However, a rare earth (Nd, Dy) metal component of such a permanent magnet has limited availability in a few nations such as China, is typically very expensive, and a price thereof severely fluctuates.

As an alternative to using rare earth metals, application of an induction motor is considered, but in order to exhibit the same motor performance, there is an undesirable increase of a volume and weight.

Further, development of a Wound Rotor Synchronous Motor (WRSM) that can replace a PMSM as a drive motor using as a power source of an environmentally-friendly vehicle has been performed.

When applying a current by winding a coil in a rotor as well as a stator, the WRSM makes the rotor into an electromagnet, thereby replacing a permanent magnet of the PMSM.

In such a WRSM, the rotor is disposed at a predetermined gap within the stator, and when power is applied to a coil of the rotor and the stator, a magnetic field is formed, and the rotor rotates by a magnetic operation occurring therebetween.

In the WRSM, unlike a PMSM, because the coil is wound in the rotor, when the rotor rotates at high speed (in a normal EV mode, maximum 10,000 rpm or more), the rotor coil may be separated by centrifugal force.

In order to prevent this, in the conventional art, as an example, by mounting an end coil cover at both end portions of a rotor and by molding a resin within the end coil cover, a rotor coil is fixed.

In the WRSM, a copper loss occurs by resistance of the rotor coil, and thus the rotor coil is heated and a performance of the motor may be deteriorated. Particularly, as the WRSM molds a resin within the end coil cover, there is a high likelihood that a cooling performance of the motor may be deteriorated.

Further, in the conventional art, in order to reduce a loss of the WRSM and to enhance efficiency thereof, a coil space factor of the rotor as well as a coil space factor of the stator is increased, and due to a high coil space factor within a slot of the rotor, insulation secured between other phase coils is important. Further, in the WRSM, when the rotor rotates at high speed, alignment of the coil is deteriorated by centrifugal force operating in the coil, and thus a fault may occur.

In order to secure such insulation between coils and to support a centrifugal force operating in the coil, the WRSM uses a support structure (typically referred to as an "insulation structure" or "wedge").

Such a support structure is inserted in a shaft direction into a rotor slot and supports other phase coils, and in the conventional art, development of the support structure can reduce a wind loss of the motor while securing an assembly performance of a rotor slot and sufficient mechanical strength to support a centrifugal force of a coil.

The above information disclosed in this Background section is only for enhancement of understanding of the background of the invention and therefore it may contain information that does not form the prior art that is already known in this country to a person of ordinary skill in the art.

SUMMARY

The present invention provides a Wound Rotor Synchronous Motor (WRSM) for a vehicle having advantages of being capable of efficiently dissipating heat produced in a rotor coil through movement of external air and having a non-molding type open structure.

The present invention also provides a WRSM having advantages of being capable of securing an assembly performance and mechanical strength of a support structure that supports a coil of a rotor and improving efficiency of the motor.

An exemplary embodiment of the present invention provides a Wound Rotor Synchronous Motor (WRSM) including a rotor body that is rotatably installed at a predetermined gap within a stator, and a rotor coil that is wound at a plurality of rotor teeth, including: bobbins each disposed at both sides of a shaft direction of the rotor body and configured to support the rotor coil and be fixed to the rotor body by the rotor coil; a wedge member inserted in a shaft direction between the rotor teeth of the rotor body so as to protrude to the outside of both ends of the rotor body, the wedge member supporting the rotor coil; and end coil covers that enclose a protruded portion of the wedge member at both sides of the shaft direction of the rotor body and that are each mounted at the bobbins.

The bobbins form a plurality of first connection passages that are opened in a shaft direction of the rotor body.

The end coil covers form at least one second connection passage that is connected with a corresponding one of the first connection passages.

The rotor body may be formed in a non-molding type open structure by the bobbins and the end coil covers.

The first and second connection passages may be connected between the rotor teeth in which the rotor coil is wound in the rotor body.

The bobbins may include a plurality of coil supports that support the rotor teeth and that radially partition the plurality of first connection passages.

The end coil covers may include a plurality of ribs that radially partition the second connection passage.

The protruded portion of the wedge member may penetrate the first connection passages of the bobbins and support the second connection passage of the end coil cover.

Another embodiment of the present invention provides a Wound Rotor Synchronous Motor (WRSM) including a rotor body that is rotatably installed at a predetermined gap within a stator, and a rotor coil that is wound at a plurality of rotor teeth, including: bobbins each disposed at both sides of a shaft direction of the rotor body and configured to support the rotor coil and be fixed to the rotor body by the rotor coil; a wedge member inserted in the shaft direction between the rotor teeth of the rotor body so as to support the rotor coil; and end coil covers that are each mounted at the bobbins at both sides of the shaft direction of the rotor body, wherein the wedge member faces an interior diameter surface of the stator at an end portion of the rotor teeth, is coupled to an end portion of a rotor shoe that is protruded to both sides, and supports both side surfaces and exterior diameter surface side of the rotor shoe.

The wedge member may include: a support that is disposed in the shaft direction between the rotor teeth and that forms a hollow in the shaft direction; and a coupler that is integrally connected with the support and that is coupled to an end portion of both sides of the rotor shoe and that supports both side surfaces and an exterior diameter surface of the rotor shoe.

The coupler may include: a first portion having a coupling groove coupled to an end portion of both sides of the rotor shoe and that supports both side surfaces of the rotor shoe; and a second portion that is integrally connected with the first portion and that supports an exterior diameter surface of the rotor shoe.

The second portion may be located at a gap between an interior diameter surface of the stator and an exterior diameter surface of the rotor shoe.

Yet another embodiment of the present invention provides a Wound Rotor Synchronous Motor (WRSM) including a rotor body that is rotatably installed at a predetermined gap within a stator, and a rotor coil that is wound at a plurality of rotor teeth, including: bobbins each disposed at both sides of a shaft direction of the rotor body and configured to support the rotor coil and be fixed to the rotor body by the rotor coil; a wedge member inserted in a shaft direction between the rotor teeth of the rotor body so as to protrude to the outside of both ends of the rotor body, the wedge member supporting the rotor coil; and end coil covers that enclose a protruded portion of the wedge member at both sides of the shaft direction of the rotor body and that are each mounted at the bobbins, wherein the bobbins form a plurality of first connection passages that are opened in the shaft direction of the rotor body, the end coil covers form at least one second connection passage that is connected with a corresponding one of the first connection passages, and the wedge member faces an interior diameter surface of the stator at an end portion of the rotor teeth, is coupled to an end portion of a rotor shoe that is protruded to both sides, and supports both side surfaces and exterior diameter surface side of the rotor shoe.

The wedge member may form a hollow that is connected with a second connection passage of the end coil cover.

The wedge member may include: a support that is disposed in the shaft direction between the rotor teeth and that forms a hollow; and a coupler that is integrally connected with the support and that is coupled to an end portion of both sides of the rotor shoe and that supports both side surfaces and an exterior diameter surface of the rotor shoe.

The protruded portion of the wedge member may penetrate the first connection passages of the bobbins and support the second connection passage of the end coil cover through the coupler.

According to an exemplary embodiment of the present invention, a cooling performance of a rotor coil as a non-molding type open rotor structure can be maximized, and by enhancing a coupling structure of a wedge member, a wind loss of a motor can be reduced and motor efficiency can further increase.

BRIEF DESCRIPTION OF THE DRAWINGS

The drawings are illustrated for describing an exemplary embodiment of the present invention and thus the scope of the present invention should not be analyzed to be limited to the accompanying drawings.

DETAILED DESCRIPTION OF THE EMBODIMENTS

Figure 1:
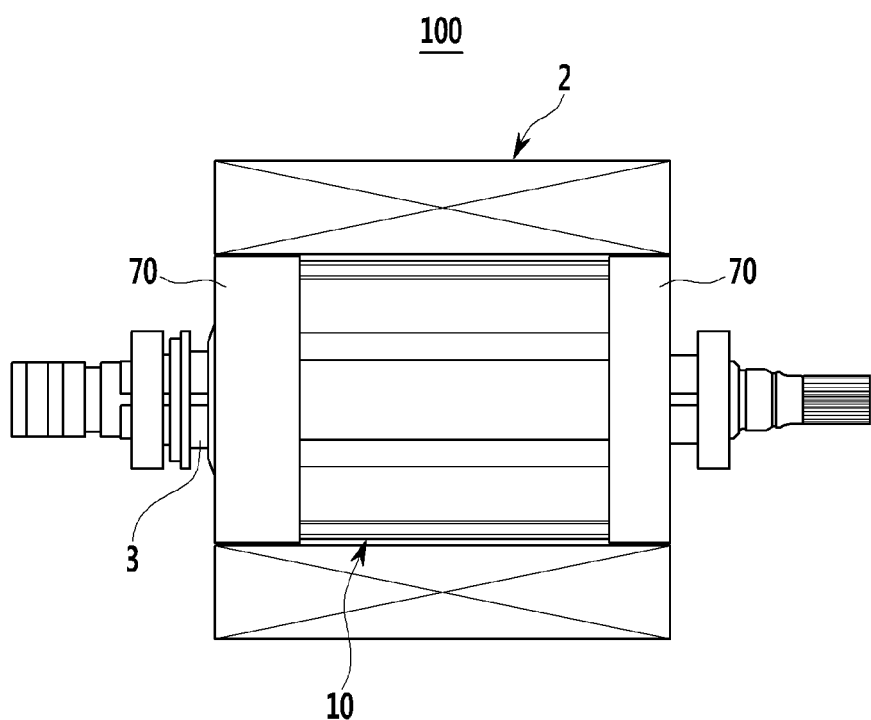
FIG. 1 is a diagram illustrating a Wound Rotor Synchronous Motor (WRSM) according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

FIG. 1 is a diagram illustrating a WRSM according to an exemplary embodiment of the present invention.

Referring to FIG. 1, a WRSM 100 according to an exemplary embodiment of the present invention may be applied to a transmission gear that obtains a driving torque with electrical energy in an environmentally-friendly vehicle.

For example, the WRSM 100 includes a stator 2 in which a stator coil (not shown) is wound and a rotor 200 in which a rotor coil 1 is wound and that is disposed within the stator 2.

In the foregoing description, a rotation shaft 3 is coupled to a central portion side of the rotor 200, and an exterior diameter surface of the rotor 200 is disposed at the inside of the stator 2 at a predetermined gap from an interior diameter surface of the stator 2.

Therefore, when winding the rotor coil 1 in the rotor 200 as well as the stator 2 and applying a current thereto, the WRSM 100 may make the rotor 200 into an electromagnet and generate a driving torque with an electromagnetic attractive force and repulsive force between an electromagnet of the rotor 200 and an electromagnet of the stator 2.

The WRSM 100 according to an exemplary embodiment of the present invention has a non-molding type open structure and has a structure that can efficiently dissipate heat occurring in the rotor coil 1 through movement of external air.

Further, in an exemplary embodiment of the present invention, there is provided the rotor 200 of the WRSM 100 that can secure an assembly performance and mechanical strength of a support structure (hereinafter, referred to as a "wedge member") that supports the rotor coil 1 and that can improve motor efficiency.

Figure 2:
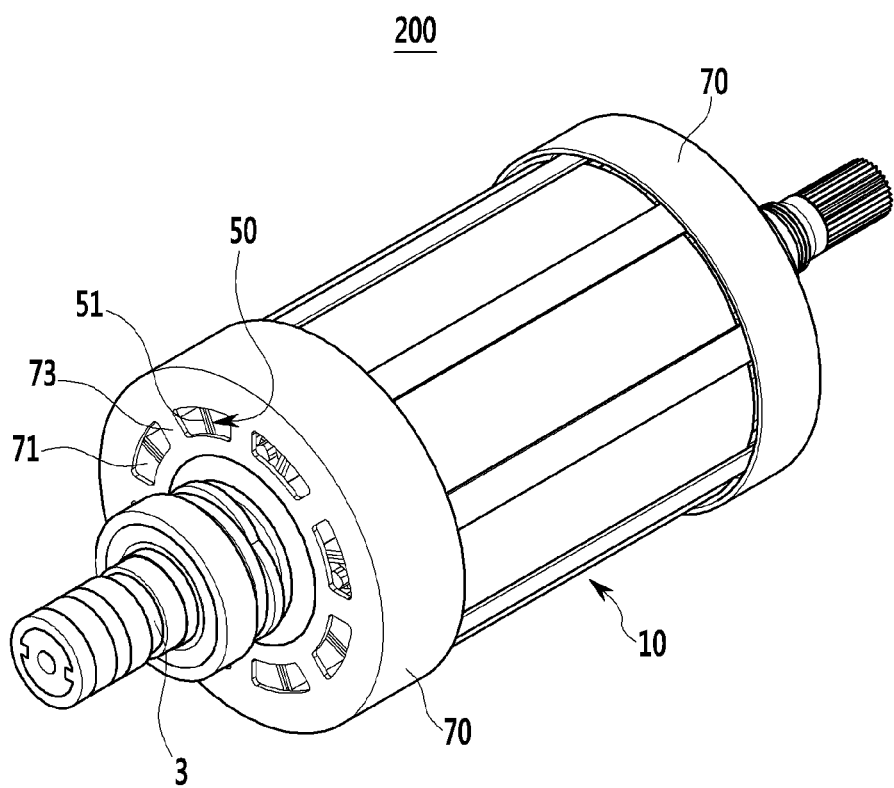
FIG. 2 is a perspective view illustrating a rotor that is applied to a WRSM according to an exemplary embodiment of the present invention.
Figure 3:
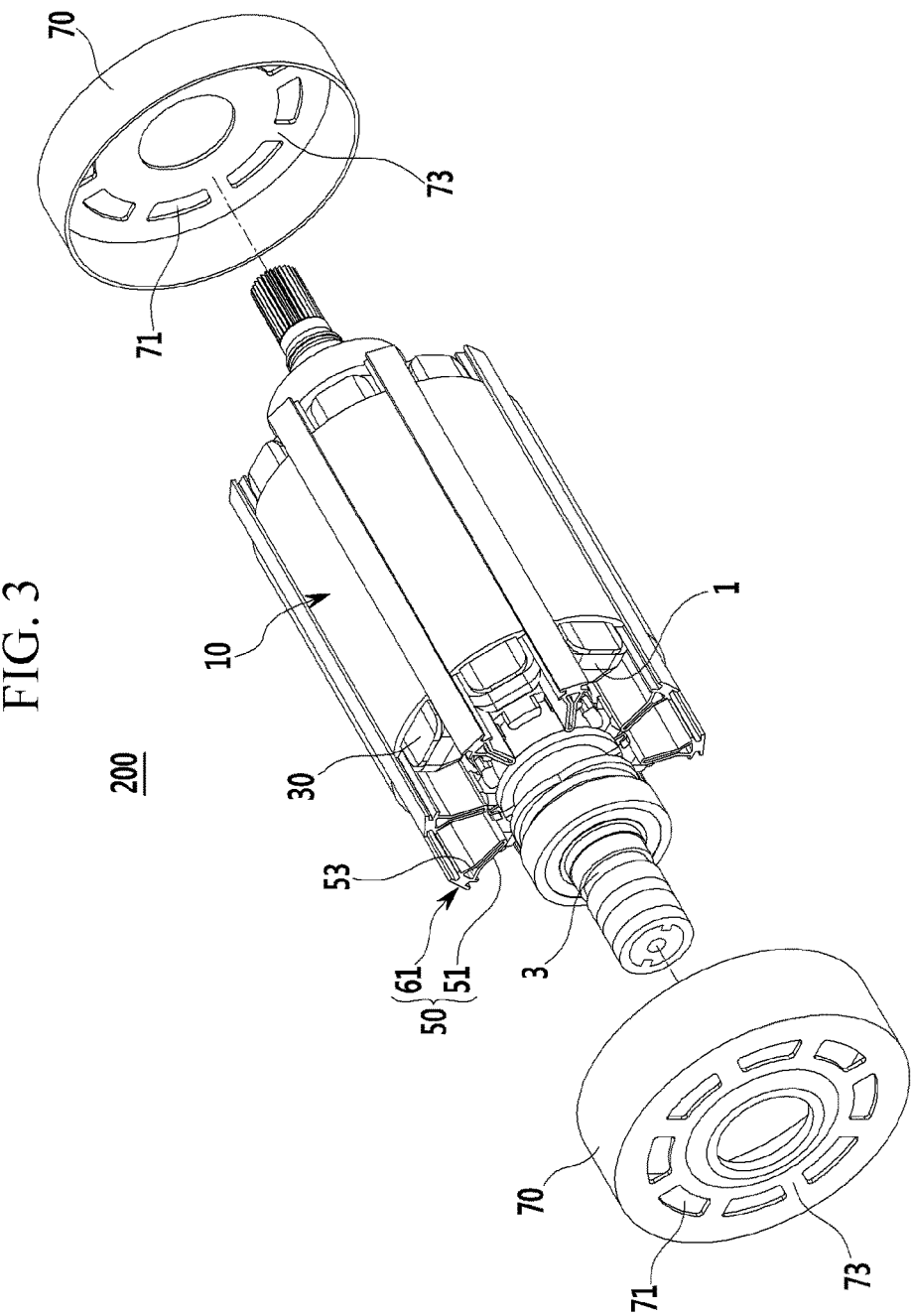
FIG. 3 is a partially exploded perspective view of a rotor that is applied to a WRSM according to an exemplary embodiment of the present invention.

FIG. 2 is a perspective view illustrating a rotor that is applied to a WRSM according to an exemplary embodiment of the present invention, and FIG. 3 is a partially exploded perspective view of a rotor that is applied to a WRSM according to an exemplary embodiment of the present invention.

Referring to FIGS. 1 to 3, the rotor 200 of the WRSM 100 according to an exemplary embodiment of the present invention includes a rotor body 10, a bobbin 30, a wedge member 50, and an end coil cover 70.

In an exemplary embodiment of the present invention, the rotor body 10 has a rotor core in which one or more steel sheets are layered, and is rotatably installed at a predetermined gap within the stator 2. The rotation shaft 3 is coupled to a central portion of the rotor body 10.

Here, the rotor body 10 may be fixed in a shaft direction to the rotation shaft 3 of the central portion side through a retainer. Such a retainer is widely-known technology in the art, and therefore a detailed description thereof will be omitted.

The rotor body 10 includes a plurality of rotor teeth 11 (see, e.g., FIG. 5) in which the rotor coil 1 is wound. The rotor teeth 11 protrude in a radial direction of the rotor body 10 and are separately disposed by a predetermined gap in a circumference direction of the rotor body 10. A slot 13 (see, e.g., FIG. 5) for winding the rotor coil 1 in the rotor teeth 11 is formed between the rotor teeth 11.

The rotor body 10 includes a rotor shoe 15 (see, e.g., FIG. 5) that protrudes to both sides in a circumference direction at an end portion facing an interior diameter surface of the stator 2 and that has an exterior diameter surface as a curved surface opposite to an interior diameter surface of the stator 2.

Here, an end portion of both sides of the rotor shoe 15 is disposed at a predetermined gap from an end portion of both sides of a neighboring rotor shoe 15. The rotor shoe 15 is a gap opposing surface and forms a curved surface (exterior diameter surface) having eccentricity based on a rotation central point of the rotor 200.

In an exemplary embodiment of the present invention, the bobbin 30 supports the rotor coil 1 that is wound in the rotor teeth 11 of the rotor body 10.

The bobbin 30 may prevent the rotor coil 1 from being separated from the rotor teeth 11 by centrifugal force when the rotor body 10 rotates at high speed (in a normal EV mode, maximum 10,000 rpm or more).

Here, the bobbins 30 are made of an insulating material such as a synthetic resin and are each disposed at both sides of a shaft direction of the rotor body 10. The bobbin 30 supports the rotor coil 1 that is wound in the rotor teeth 11 and may be fixed to the rotor body 10 by the rotor coil 1.

Figure 4:
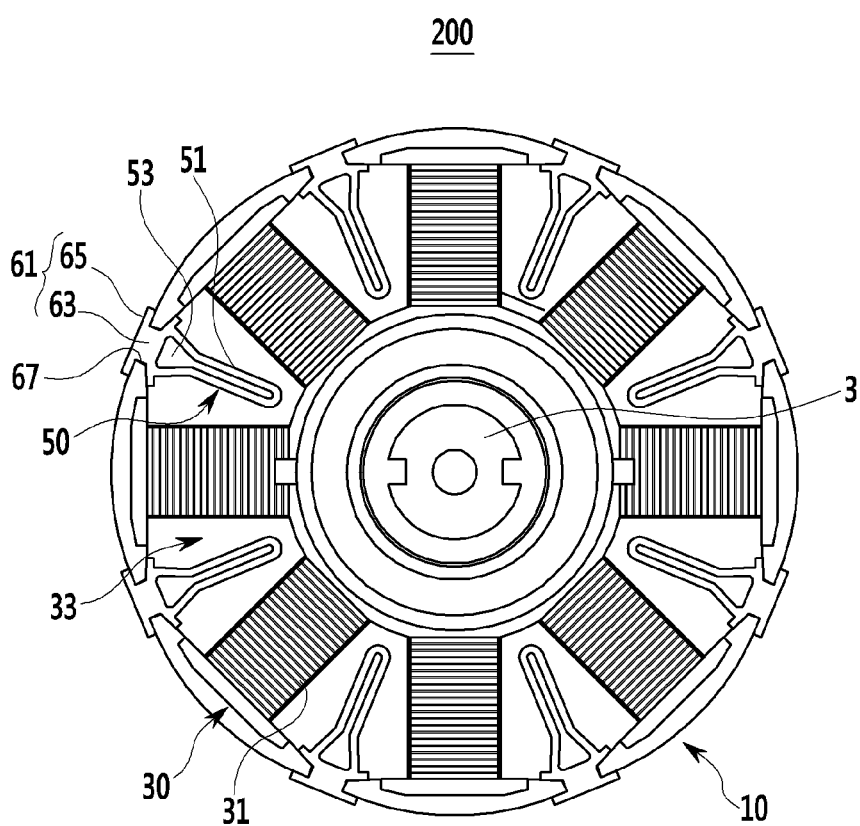
FIG. 4 is a diagram illustrating a bobbin and wedge member of a rotor that is applied to a WRSM according to an exemplary embodiment of the present invention.

FIG. 4 is a diagram illustrating a bobbin and wedge member of a rotor that is applied to a WRSM according to an exemplary embodiment of the present invention.

Referring to FIG. 4, in an exemplary embodiment of the present invention, the bobbin 30 forms a plurality of coil supports 31 for supporting the rotor coil 1 with interposed the rotor teeth 11 therebetween at an end portion of both sides of the rotor body 10.

The coil supports 31 support the rotor coil 1 that is wound in the rotor teeth 11 while supporting the rotor teeth 11 at both sides of a shaft direction of the rotor body 10. The coil supports 31 are radially and separately disposed by a predetermined gap toward the center to correspond to the rotor teeth 11.

Further, the bobbin 30 according to an exemplary embodiment of the present invention forms a first connection passage 33 between the coil supports 31. The first connection passage 33 is radially partitioned based on the center of the bobbin 30 by the coil supports 31.

Such a first connection passage 33 is a hole that is opened in a shaft direction of the rotor body 10 and is connected with the slot 13 between the rotor teeth 11.

Figure 5:
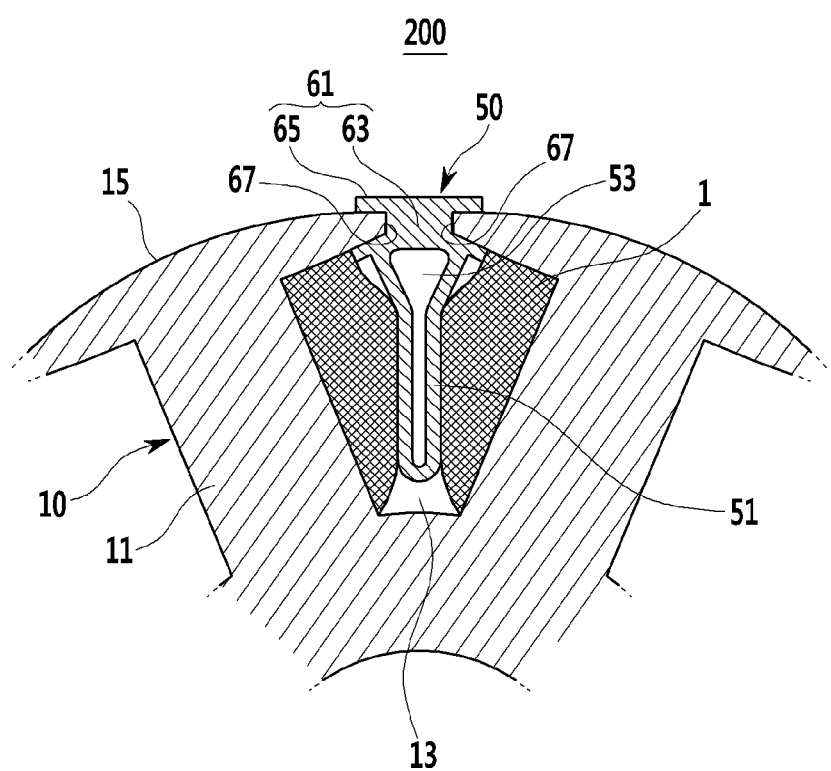
FIG. 5 is a diagram illustrating a wedge member coupling structure of a rotor that is applied to a WRSM according to an exemplary embodiment of the present invention.

FIG. 5 is a diagram illustrating a wedge member coupling structure of a rotor that is applied to a WRSM according to an exemplary embodiment of the present invention.

Referring to FIGS. 4 and 5, in an exemplary embodiment of the present invention, the wedge member 50 is a support structure that supports the rotor coil 1 that is wound in the rotor teeth 11 and is installed at the slot 13 between the rotor teeth 11.

The wedge member 50 supports a centrifugal force that operates in the rotor coil 1 when the rotor body 10 rotates at high speed and secures insulation from another phase rotor coil 1 within the slot 13 while securing alignment of the rotor coil 1.

The wedge member 50 is inserted in a shaft direction at the slot 13 between the rotor teeth 11 and is made of an insulating material for insulation between the rotor coils 1 that are wound in the rotor teeth 11.

Further, the wedge member 50 is inserted in a shaft direction into the slot 13 between the rotor teeth 11 and is coupled to an end portion of both sides of the rotor shoe 15. The wedge member 50 supports both side surfaces and exterior diameter surface side of the rotor shoe 15 between end portions of both sides of the neighboring rotor shoe 15.

Such a wedge member 50 includes a support 51 and a coupler 61. The support 51 substantially supports the rotor coil 1 at the slot 13 between the rotor teeth 11.

The support 51 is inserted in a sliding method in a shaft direction into the slot 13 between the rotor teeth 11 and is disposed at the slot 13. The support 51 has an elastic deformable triangular sectional shape and forms both side surfaces that support the rotor coil 1 at the slot 13. The support 51 forms a predetermined hollow 53 in a shaft direction toward the inside.

The coupler 61 fixes the wedge member 50 to the rotor body 10 in a shaft direction. The coupler 61 is integrally connected with the remaining portions, except for a surface that supports the rotor coil 1 of the support 51. The coupler 61 is coupled in a sliding method to an end portion of both sides of the rotor shoe 15 and supports both side surfaces and an exterior diameter surface of the rotor shoe 15.

Further, the coupler 61 includes a first portion 63 that is integrally connected with the remaining portions, except for a surface that supports the rotor coil 1 of the support 51 and that is coupled to an end portion of both sides of the rotor shoe 15 and that supports both side surfaces of the rotor shoe 15 and a second portion 65 that is integrally connected with the first portion 63 and that supports an exterior diameter surface of the rotor shoe 15.

Here, the first portion 63 forms a coupling groove 67 that couples to an end portion of neighboring both sides of the rotor shoe 15 and supports both side surfaces of the rotor shoe 15. The first portion 63 is inserted in a sliding method into an end portion of both sides of the rotor shoe 15 by the coupling groove 67 and may be coupled in a shaft direction of the rotor body 10.

The second portion 65 supports an exterior diameter surface of the rotor shoe 15 at the outside of the slot 13 of the rotor body 10 and locates at a gap between an interior diameter surface of the stator 2 and an exterior diameter surface of the rotor shoe 15.

The wedge member 50 is partially protruded to the outside of both ends of the rotor body 10 in a state that is coupled to the slot 13 between the rotor teeth 11. A protruded portion of both sides of the wedge member 50 penetrates the first connection passage 33 of the bobbin 30 and supports the end coil cover 70 to be described later.

In an exemplary embodiment of the present invention, as shown in FIGS. 2 and 3, the end coil cover 70 prevents the rotor coil 1 from being separated from the rotor teeth 11 by a centrifugal force when the rotor body 10 rotates at high speed (in a normal EV mode, maximum 10,000 rpm or more). The end coil covers 70 may be each mounted at both sides of a shaft direction of the rotor body 10, may enclose a protruded portion of the wedge member 50, and may be fixedly coupled to the bobbin 30.

Such an end coil cover 70 forms at least one second connection passage 71 for moving external air to both sides of the rotor body 10. For example, the second connection passage 71 preferably is provided in plural, and is radially and separately formed toward the center of the end coil cover 70. Therefore, in the end coil cover 70, a plurality of ribs 73 for radially partitioning the second connection passage 71 are formed.

Such a second connection passage 71 is connected with the first connection passage 33 of the bobbin 30, and the first and second connection passages 71 are connected between the rotor teeth 11. Here, a protruded portion of the wedge member 50 that penetrates the first connection passage 33 supports the second connection passage 71 side of the end coil cover 70.

In a protruded end portion of both sides of the wedge member 50, the support 51 is exposed to the second connection passage 71, the hollow 53 of the support 51 is connected with the second connection passage 71, and the coupler 61 supports the edge side of the second connection passage 71.

The rotor 200 of the WRSM 100 according to an exemplary embodiment of the present invention may be formed in a non-molding type open structure by the bobbin 30 and the end coil cover 70.

In order words, when rotating at high speed, the rotor 200 an exemplary embodiment of the present invention supports a centrifugal force operating in the rotor coil 1, and in order to secure alignment of the rotor coil 1, the rotor 200 has a structure that can secure fixed strength of the rotor coil 1 through the bobbin 30 and the wedge member 50 without molding a resin within the end coil cover 70.

The rotor 200 an exemplary embodiment of the present invention may move external air to the rotor coil 1 of the rotor body 10 through the first connection passage 33 of the bobbin 30 and the second connection passage 71 of the end coil cover 70.

Hereinafter, operation of the WRSM 100 according to an exemplary embodiment of the present invention having the above-described configuration will be described in detail with reference to the drawings.

First, in an exemplary embodiment of the present invention, when a current is applied to the stator coil of the stator 2 and the rotor coil 1 of the rotor body 10, the rotor body 10 rotates by a magnetic operation occurring between the stator 2 and the rotor body 10. In this case, a copper loss occurs by resistance of the rotor coil 1 and thus in the rotor coil 1, heat is produced.

In an exemplary embodiment of the present invention, by forming the first connection passage 33 in the bobbin 30, forming the second connection passage 71 that is connected with the first connection passage 33 in the end coil cover 70, and protruding the wedge member 50 to the outside of both ends of the rotor body 10, air may move to the rotor coil 1 of the rotor body 10.

Here, a protruded portion of the wedge member 50 may rapidly move air within the end coil cover 70 and move the air to the rotor coil 1 through the second connection passage 71 of the end coil cover 70 and the first connection passage 33 of the bobbin 30.

Therefore, in an exemplary embodiment of the present invention, by moving external air, heat produced in the rotor coil 1 may be discharged to the outside, and the rotor coil 1 may be thus quickly cooled. Further, external air of the end coil cover 70 moves in a shaft direction of the rotor body 10 through the hollow 53 of the wedge member 50 and cools the rotor coil 1.

Therefore, in an exemplary embodiment of the present invention, because the WRSM has a non-molding type open rotor structure, moves external air, efficiently discharges heat produced in the rotor coil 1, a copper loss by resistance of the rotor coil 1 can be reduced, and motor efficiency can be increased.

Further, in an exemplary embodiment of the present invention, a production cost can reduce due to deletion of a molding resin, and by direct cooling of external air to the rotor coil 1, a cooling performance of the rotor 200 can further increase.

In an exemplary embodiment of the present invention, the wedge member 50 is inserted in a sliding method in a shaft direction into an end portion of both sides of the rotor shoe 15 by the coupling groove 67 of the coupler 61. The coupler 61 of the wedge member 50 supports both side surfaces and an exterior diameter surface of the rotor shoe 15 and locates at a gap between an interior diameter surface of the stator 2 and an exterior diameter surface of the rotor shoe 15.

Therefore, in an exemplary embodiment of the present invention, because the wedge member 50 may be securely coupled to an end portion of both sides of the rotor shoe 15 by the coupler 61, when the rotor 200 rotates at high speed, a centrifugal force operating in the rotor coil 1 is supported, alignment of the rotor coil 1 can be secured, and fixed strength of the rotor coil 1 can be secured. Therefore, in an exemplary embodiment of the present invention, an assembly performance and mechanical strength of the wedge member 50 can be improved, and a high speed rotation stability of the rotor 200 can be enhanced.

Further, in an exemplary embodiment of the present invention, because the coupler 61 of the wedge member 50 supports an exterior diameter surface of the rotor shoe 15 at a gap between an interior diameter surface of the stator 2 and an exterior diameter surface of the rotor shoe 15, a turbulence movement at a gap occurring due to a salient pole structure and an eccentric structure of the rotor body 10 can be reduced. Therefore, in an exemplary embodiment of the present invention, by reducing saliency of a motor, a wind loss can be reduced and thus motor efficiency can be further improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A Wound Rotor Synchronous Motor (WRSM) having a rotor body that is rotatably installed at a predetermined gap within a stator, and a rotor coil that is wound at a plurality of rotor teeth, the WRSM comprising:
   bobbins each disposed at both sides of a shaft direction of the rotor body and configured to support the rotor coil and be fixed to the rotor body by the rotor coil;
   a wedge member inserted in a shaft direction between the rotor teeth of the rotor body so as to protrude to the outside of both ends of the rotor body, the wedge member supporting the rotor coil; and
   end coil covers that enclose a protruded portion of the wedge member at both sides of the shaft direction of the rotor body and that are each mounted at the bobbins,
   wherein the bobbins form a plurality of first connection passages that are opened in a shaft direction of the rotor body, and
   the end coil covers form at least one second connection passage that is connected with a corresponding one of the first connection passages.

2. The WRSM of claim 1, wherein the rotor body is formed in a non-molding type open structure by the bobbins and the end coil covers.

3. The WRSM of claim 1, wherein the first and second connection passages are connected between the rotor teeth in which the rotor coil is wound in the rotor body.

4. The WRSM of claim 1, wherein the bobbins comprise a plurality of coil supports that support the rotor teeth and that radially partition the plurality of first connection passages.

5. The WRSM of claim 4, wherein the end coil covers comprise a plurality of ribs that radially partition the second connection passage.

6. The WRSM of claim 5, wherein the protruded portion of the wedge member penetrates the first connection passages of the bobbins and supports the second connection passage of the end coil covers.

7. A Wound Rotor Synchronous Motor (WRSM) having a rotor body that is rotatably installed at a predetermined gap within a stator, and a rotor coil that is wound at a plurality of rotor teeth, the WRSM comprising:
   bobbins each disposed at both sides of a shaft direction of the rotor body and configured to support the rotor coil and be fixed to the rotor body by the rotor coil;
   a wedge member inserted in the shaft direction between the rotor teeth of the rotor body so as to support the rotor coil; and
   end coil covers that are each mounted at the bobbins at both sides of the shaft direction of the rotor body,
   wherein the wedge member faces an interior diameter surface of the stator at an end portion of the rotor teeth, is coupled to an end portion of a rotor shoe that is protruded to both sides, and supports both side surfaces and an exterior diameter surface side of the rotor shoe.

8. The WRSM of claim 7, wherein the wedge member comprises:
   a support that is disposed in the shaft direction between the rotor teeth and that forms a hollow in the shaft direction; and
   a coupler that is integrally connected with the support and that is coupled to an end portion of both sides of the rotor shoe and that supports both side surfaces and an exterior diameter surface of the rotor shoe.

9. The WRSM of claim 8, wherein the coupler comprises:
a first portion having a coupling groove coupled to an end portion of both sides of the rotor shoe and that supports both side surfaces of the rotor shoe; and
a second portion that is integrally connected with the first portion and that supports an exterior diameter surface of the rotor shoe.

10. The WRSM of claim 9, wherein the second portion is located at a gap between an interior diameter surface of the stator and an exterior diameter surface of the rotor shoe.

11. A Wound Rotor Synchronous Motor (WRSM) having a rotor body that is rotatably installed at a predetermined gap within a stator, and a rotor coil that is wound at a plurality of rotor teeth, the WRSM comprising:
bobbins each disposed at both sides of a shaft direction of the rotor body configured to support the rotor coil and be fixed to the rotor body by the rotor coil;
a wedge member inserted in a shaft direction between the rotor teeth of the rotor body so as to protrude to the outside of both ends of the rotor body, the wedge member supporting the rotor coil; and
end coil covers that enclose a protruded portion of the wedge member at both sides of the shaft direction of the rotor body and that are each mounted at the bobbins,
wherein the bobbins form a plurality of first connection passages that are opened in the shaft direction of the rotor body,
the end coil covers form at least one second connection passage that is connected with a corresponding one of the first connection passages, and
the wedge member faces an interior diameter surface of the stator at an end portion of the rotor teeth, is coupled to an end portion of a rotor shoe that is protruded to both sides, and supports both side surfaces and an exterior diameter surface side of the rotor shoe.

12. The WRSM of claim 11, wherein the wedge member forms a hollow that is connected with a second connection passage of the end coil cover.

13. The WRSM of claim 12, wherein the wedge member comprises:
a support that is disposed in a shaft direction between the rotor teeth and that forms said hollow; and
a coupler that is integrally connected with the support and coupled to an end portion of both sides of the rotor shoe and that supports both side surfaces and an exterior diameter surface of the rotor shoe.

14. The WRSM of claim 13, wherein the protruded portion of the wedge member penetrates the first connection passages of the bobbins and supports the second connection passage of the end coil cover through the coupler.

* * * * *